United States Patent
Kennedy et al.

(10) Patent No.: US 10,626,207 B1
(45) Date of Patent: Apr. 21, 2020

(54) HIGH-STRENGTH LOW-CREEP THERMOPLASTIC ELASTOMER

(71) Applicants: Joseph Kennedy, Akron, OH (US); Turgut Nugay, Sariyer-Istanbul (TR); Nihan Nugay, Sariyer-Istanbul (TR)

(72) Inventors: Joseph Kennedy, Akron, OH (US); Turgut Nugay, Sariyer-Istanbul (TR); Nihan Nugay, Sariyer-Istanbul (TR)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 16/607,382

(22) PCT Filed: Jul. 18, 2018

(86) PCT No.: PCT/US2018/042636
§ 371 (c)(1),
(2) Date: Oct. 23, 2019

(87) PCT Pub. No.: WO2019/018495
PCT Pub. Date: Jan. 24, 2019

Related U.S. Application Data

(60) Provisional application No. 62/533,706, filed on Jul. 18, 2017.

(51) Int. Cl.
*C08F 257/02* (2006.01)
*C08F 285/00* (2006.01)
(Continued)

(52) U.S. Cl.
CPC .............. *C08F 257/02* (2013.01); *C08F 8/10* (2013.01); *C08F 8/20* (2013.01); *C08F 10/08* (2013.01);
(Continued)

(58) Field of Classification Search
CPC ..................................................... C08F 257/02
See application file for complete search history.

(56) References Cited

U.S. PATENT DOCUMENTS

| 3,894,119 A | 7/1975 | Forbes et al. |
| 6,512,056 B1 | 1/2003 | Kennedy et al. |

(Continued)

FOREIGN PATENT DOCUMENTS

EP      0348963 A1    1/1990

OTHER PUBLICATIONS

Kennedy Journal of Polymer Science 13, 2213-2220 (Year: 1975).*
(Continued)

*Primary Examiner* — Mark S Kaucher
(74) *Attorney, Agent, or Firm* — Renner Kenner; Greive Bobak; Taylor & Weber

(57) ABSTRACT

A polystyrene-g-(polyisobutylene-b-polystyrene) is taught. The polystyrene-g-(polyisobutylene-b-polystyrene) is synthesized by first providing a polystyrene backbone. Once the polystyrene backbone is provided, the polystyrene backbone is acetylated to provide acetyl groups on the polystyrene backbone. Next, the acetyl groups are converted to —$C(CH_3)_2OH$ groups. Finally, the living polymerization of isobutylene is initiated, which is then followed by the living block polymerization of styrene. A polymer network of polystyrene-g-(polyisobutylene-b-polystyrene)s is also provided.

23 Claims, 1 Drawing Sheet

(51) Int. Cl.
  *C08F 12/08*  (2006.01)
  *C08F 8/10*   (2006.01)
  *C08F 8/20*   (2006.01)
  *C08F 10/08*  (2006.01)

(52) U.S. Cl.
  CPC ............ *C08F 12/08* (2013.01); *C08F 285/00* (2013.01); *C08F 2438/00* (2013.01)

(56) References Cited

U.S. PATENT DOCUMENTS

2010/0076538 A1    3/2010   Desai et al.
2013/0261250 A1*  10/2013   Stojcevic ................ A61L 31/10
                                                    524/548

OTHER PUBLICATIONS

Donderer et al. Polymer Bullitin 47, 509-516 (Year: 2002).*
Fonagy et al. Macromol. Rapid Commun. 19, 479-483 (Year: 1998).*
Kali et al. Macromol. Chem. Phys. 208, 1388-1393 (Year: 2007).*
Aiman M. Atta; Graft Copolymerization of Polyisobutylene and polychlorobutyl onto polystyrene waste; Polymer International; Aug. 18, 1999; vol. 48, pp. 837-842; p. 839.
Kali, et al.; A New Synthetic Method for the Preparation of Star-Shaped Polyisobutylene with Hyperbranched Polystyrene Core; Macromolecular Chemistry and Physics, Jul. 2, 2007; vol. 208, pp. 1388-1393; p. 1390.
Jankova, et al; Synthesis of Poly(styrene-b-isobutylene-b-styrene) triblock copolymer by ATRP; Polymer Bulletin, Dec. 1998; vol. 41, pp. 639-644; Title.

* cited by examiner

HIGH-STRENGTH LOW-CREEP THERMOPLASTIC ELASTOMER

CROSS-REFERENCE TO RELATED APPLICATIONS

This application claims the benefit of U.S. Provisional Application Ser. No. 62/533,706 entitled "Graft SIBS: A New High-Strength Low-Creep Thermoplastic Elastomer" filed Jul. 18, 2017, which is incorporated herein by reference in its entirety.

FIELD OF THE INVENTION

The present invention relates to a novel thermoplastic elastomer. More particularly, the present invention relates to a novel thermoplastic elastomer exhibiting advantageous mechanical properties such as high strength and very low creep. Specifically, the present invention relates to the structure and synthesis of a polystyrene-g-(polyisobutylene-b-polystyrene) (PSt-g-P(IB-b-St)), wherein the living cationic polymerization of isobutylene may be initiated by various one or more functionalized polystyrene backbones at various sites along the at least one polystyrene backbone. The resulting structure provides for two or more polyisobutylenes grafted to any one polystyrene backbone, wherein styrene can then be polymerized after the isobutylene, so as to provide a PSt-g-P(IB-b-St) as defined herein exhibiting advantageous mechanical properties such as, amongst others, high-strength and very low creep. The present invention also relates to polymer networks of PSt-g-P(IB-b-St).

BACKGROUND OF THE INVENTION

Poly(Styrene-b-Isobutylene-b-Styrene) (SIBS) is a thermoplastic elastomer that has gained attention recently due to its high degree of biocompatibility. Due to its biocompatibility, SIBS has been found to be useful for a variety of application, such as stent coating, stoppers, glaucoma shunt, and tubing. This linear block copolymer has a triblock structure formed by a polyisobutylene (PIB) core sandwiched between blocks of polystyrene (PS). The formulation of SIBS can be tailored for different applications by changing the weight percentage of PS or by changing the molecular weight of the polymer chains. The hard PS blocks provide SIBS with a glassy microstructure that enhances mechanical strength and rigidity of the material, while the PIB has a soft microstructure with increased chain mobility that gives the polymer its elastomeric properties. The possibility of tailoring mechanical properties, together with the high degree of biocompatibility, makes SIBS an ideal material for use in biomedical devices.

However, there is a high cost associated with making SIBS. The high cost (30-40%) of most SIBS products is largely due to the expensive bifunctional polymerization initiator need for synthesis. Typically, that expensive bifunctional polymerization initiator is 1-(tert-butyl)-3,5-bis(2-chloropropan-2-yl)benzene. A commercial version of SIBS, named SIBSTAR, available from Kaneka Co., used mainly as additive in various industrial applications, is strongly contaminated with ill-defined diblocks.

Block copolymers of similar compositions might have diverse mechanical properties due to their composite nature. Parameters such as molecular weight, block weight percentage, and polymer chain structure are known to give rise to different microstructures that in turn lead to different material properties. Different grades of SIBS can have very different morphologies based on the ratio of hard phase to soft phase. At lower contents of PS, the hard phase forms spherical domains through the soft matrix. As the PS content increases, the spherical domains become double gyroid structures, and as the PS content is further increased, the structure of the hard phase becomes lamellar. It is likely that the incompatibility of the soft and hard phases leads to micro-phase separations and results in the different morphologies described. It is well known that for composite systems, the interface between different phases plays a major role in the performance of the material. A weakened interface might lead to premature cracking and failure. Additionally, the method of fabrication for SIBS might play a very important role due to the incompatibility of the different phases. Therefore, different methods may result in different qualities of the interface.

However, for all of its attributes, SIBS has been found to be of modest strength and tends to exhibit high creep. Therefore, the need exists for a new material, useful for implantable medical devices and industrial applications, that has the key advantageous properties of SIBS, such as biocompatibility, biostability, elasticity, and processability, but that also exhibits higher strength, toughness, and diminished creep, which SIBS does not exhibit. Furthermore, this new material should be able to be synthesized without the use of a costly multi-functional initiator.

SUMMARY OF THE INVENTION

In one embodiment, the present invention provides a polystyrene-g-(polyisobutylene-b-polystyrene). Said another way, the present invention provides a polymer composition having a polystyrene backbone and at least two polyisobutylene-polystyrene block copolymers grafted to the polystyrene backbone.

In another embodiment, the present invention provides the polystyrene-g-(polyisobutylene-b-polystyrene) in the embodiment above, wherein the graft-block copolymer has a tensile strength of greater than 20 MPa.

In another embodiment, the present invention provides a polystyrene-g-(polyisobutylene-b-polystyrene) as in any embodiment above, wherein the graft-block copolymer has an elongation of greater than 400%.

In a further embodiment, the present invention provides a method of synthesizing a polystyrene-g-(polyisobutylene-b-polystyrene) comprising the steps of providing a polystyrene backbone; acetylating the polystyrene backbone to provide between about 2 and about 20 acetyl groups on the polystyrene backbone; converting the acetyl groups to —C(CH$_3$)$_2$OH groups; and initiating in the presence of a co-initiator the living block polymerizations of isobutylene followed by styrene. More particularly, the living block polymerizations may be the living cationic polymerization of isobutylene followed by the living cationic polymerization of stryene.

In a related embodiment, the present invention provides a method of synthesizing a polystyrene-g-(polyisobutylene-b-polystyrene) as in any embodiment above, wherein the step of acetylating provides between 3 and 7 acetyl groups and preferably 4 and 7 acetyl groups, on the polystyrene backbone.

In another related embodiment, the present invention provides a method of synthesizing a polystyrene-g-(polyisobutylene-b-polystyrene) as in any embodiment above, wherein the step of acetylating provides 5 or 6 acetyl groups on the polystyrene backbone.

In yet another embodiment, the present invention provides a method of synthesizing a polystyrene-g-(polyisobutylene-b-polystyrene) as in any embodiment above, wherein prior to the step of initiating, the —C(CH$_3$)$_2$OH groups are converted to —C(CH$_3$)$_2$Cl groups.

In another related embodiment, the present invention provides a method of synthesizing a polystyrene-g-(polyisobutylene-b-polystyrene) as in any embodiment above, wherein the step of converting the —C(CH$_3$)$_2$OH groups to —C(CH$_3$)$_2$Cl groups uses hydrogen chloride to convert the —C(CH$_3$)$_2$OH groups to —C(CH$_3$)$_2$Cl groups.

In still another related embodiment, the present invention provides a method of synthesizing a polystyrene-g-(polyisobutylene-b-polystyrene) as in any embodiment above, wherein prior to the step of initiating, the —C(CH$_3$)$_2$OH groups are converted to —C(CH$_3$)$_2$OMe groups.

In yet another related embodiment, the present invention provides a method of synthesizing a polystyrene-g-(polyisobutylene-b-polystyrene) as in any embodiment above, wherein the step of converting the —C(CH$_3$)$_2$OH groups to —C(CH$_3$)$_2$OMe groups uses sodium hydride and methyl iodide to convert the —C(CH$_3$)$_2$OH groups to —C(CH$_3$)$_2$OMe groups.

In another related embodiment, the present invention provides a method of synthesizing a polystyrene-g-(polyisobutylene-b-polystyrene) as in any embodiment above, wherein the co-initiator is TiCl$_4$.

In a further related embodiment, the present invention provides a method of synthesizing a polystyrene-g-(polyisobutylene-b-polystyrene) as in any embodiment above, wherein the polymerization is terminated by methanol so as to precipitate the polystyrene-g-(polyisobutylene-b-polystyrene) and to decompose the TiCl$_4$.

In a further embodiment, the present invention provides a method of synthesizing a polystyrene-g-(polyisobutylene-b-polystyrene) as in any embodiment above, wherein the molecular weight of the polystyrene backbone is from about 5,000 g/mol to about 50,000 g/mol.

In still another related embodiment, the present invention provides a method of synthesizing a polystyrene-g-(polyisobutylene-b-polystyrene) as in any embodiment above, wherein the method produces a polystyrene-g-(polyisobutylene-b-polystyrene) having multiple polyisobutylene branch segments, and wherein the molecular weight of each of the multiple polyisobutylene branch segments is from about 10,000 g/mol to about 60,000 g/mol.

In another related embodiment, the present invention provides a method of synthesizing a polystyrene-g-(polyisobutylene-b-polystyrene) as in any embodiment above, wherein the method produces a polystyrene-g-(polyisobutylene-b-polystyrene) having multiple polystyrene branch segments, and wherein the molecular weight of each of the multiple polystyrene branch segments is from about 5,000 g/mol to about 50,000 g/mol.

In another related embodiment, the present invention provides a method of synthesizing a polystyrene-g-(polyisobutylene-b-polystyrene) as in any embodiment above, wherein the step of acetylating uses acetyl chloride in the presence of aluminum chloride, and wherein methylene chloride is a solvent to provide para-acetyl groups on the polystyrene backbone.

In yet another related embodiment, the present invention provides a method of synthesizing a polystyrene-g-(polyisobutylene-b-polystyrene) as in any embodiment above, wherein the step of converting the acetylated groups first uses methyl magnesium bromide, and then water or tetrahydrofuran to convert the acetylated groups to —C(CH$_3$)$_2$OH groups.

In still another related embodiment, the present invention provides a method of synthesizing a polystyrene-g-(polyisobutylene-b-polystyrene) as in any embodiment above, wherein the polystyrene-g-(polyisobutylene-b-polystyrene) synthesized has a tensile strength of greater than 20 MPa.

In yet another related embodiment, the present invention provides a method of synthesizing a polystyrene-g-(polyisobutylene-b-polystyrene) as in any embodiment above, wherein the polystyrene-g-(polyisobutylene-b-polystyrene) synthesized has an elongation of greater than 400%.

In another embodiment, the present invention provides a polymer network of polystyrene-g-(polyisobutylene-b-polystyrene).

In a further related embodiment, the present invention provides a polymer network as in any embodiment above, wherein each polystyrene-g-(polyisobutylene-b-polystyrene) in the polymer network contains a polystyrene backbone, multiple polystyrene branch segments, and multiple polyisobutylene branch segments.

In yet a further related embodiment, the present invention provides a polymer network as in any embodiment above, wherein each polystyrene branch segment of each polystyrene-g-(polyisobutylene-b-polystyrene) in the network aggregate towards other polystyrene branch segments of other polystyrene-g-(polyisobutylene-b-polystyrene) s.

In still a further related embodiment, the present invention provides a polymer network as in any embodiment above, wherein the polyisobutylene branch segments of each polystyrene-g-(polyisobutylene-b-polystyrene) in the network prevent aggregation of the polystyrene backbones of each polystyrene-g-(polyisobutylene-b-polystyrene).

In a further embodiment, the present invention provides an initiator for the polymerization of isobutylene, wherein the initiator is a functionalized polystyrene wherein the functionalized polystyrene has reactive groups selected from the group consisting of —OH, —Cl, or —OMe groups functionalized and extending from at least two benzene rings of the polystyrene backbone. More particularly, the reactive groups extend from the para position on the benzene rings. In another embodiment, the reactive groups extend from no more than about 20 benzene rings of the polystyrene backbone.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF ILLUSTRATIVE EMBODIMENTS

Figure 1:
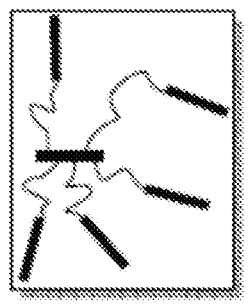
FIG. 1 is a representative structural formula of a PSt-g-P(IB-b-St)

The present invention generally relates to a novel thermoplastic elastomer having improved mechanical properties over ordinary thermoplastic elastomers. It will be appreciate that the generally recognized understanding of the term "thermoplastic elastomer" refers to the class of copolymers or a physical mix of polymers (usually a plastic and a rubber) which consist of materials with both thermoplastic and elastomeric properties. Thermoplastic elastomers typically show advantages typical of both rubbery materials and plastic materials.

The novel thermoplastic elastomer of the present invention is a polystyrene-g-(polyisobutylene-b-polystyrene) (PSt-g-P(IB-b-St)). Polystyrene-g-(polyisobutylene-b-polystyrene) is defined as a polymer composition comprising a polystyrene backbone and at least two, (and less than about 20 per 5000 g/mol polystyrene backbone) polyisobutylene-polystyrene block copolymers grafted to the polystyrene backbone at at least two (and up to about 20 per 5000 g/mol polystyrene backbone) of the benzene rings of the polystyrene backbone. The polyisobutylene-b-polystyrene copolymers are not present at the end of the polystyrene backbone chain, but rather are grafted within the polystyrene backbone, or more specifically, are connected two or more of the benzene rings of the polystyrene backbone. It will be appreciated that two or more of the benzene ring structures of the polystyrene backbone have previously been functionalized with a —OH, —Cl or —OMe group, preferably at the para position on the benzene ring structures, so as to enable the initiation of living cationic polymerization of isobutylene, when in the presence of a co-initiator. Subsequently, styrene can then be polymerized after the isobutylene, so as to provide the polyisobutylene-polystyrene block copolymer moiety. The resulting structure provides for two or more polyisobutylenes (and subsequently, two or more polyisobutylene-b-polystyrene(s)) grafted to any one polystyrene backbone.

It has been found that the novel PSt-g-P(IB-b-St) of the present invention exhibits advantageous mechanical properties such as, amongst others, high-strength and very low creep. Inasmuch as the thermoplastic elastomer itself is novel, the synthesis of the PSt-g-P(IB-b-St) is also novel in that it produces a thermoplastic elastomer exhibiting advantageous mechanical properties such as, amongst others, high-strength and very low creep. An additional important feature of the synthesis of the PSt-g-P(IB-b-St) is that the synthesis does not require the use of a costly bifunctional initiator, such as 1-(tert-butyl)-3,5-bis(2-chloropropan-2-yl)benzene. Instead, the synthesis of the PSt-g-P(IB-b-St) utilizes a functionalized polystyrene having either an —OH, —Cl, or —OMe group extending from at least two of the benzene rings of the functionalized polystyrene.

When the term "high-strength" is used in the context of the present invention, it can be defined as a material having a tensile strength of greater than 20 MPa, or, an elongation, as defined on a stress-strain curve, of greater than 400%, and more preferably, greater than 600% strain, as determined by ASTM D638—Plastic Tensile Strength Test. It will be appreciated that SIBS does not have such a high tensile strength or elongation, in that SIBS is well known to have tensile strength below 20 MPa, and elongation less than 400% as determined by the same ASTM standards.

When the term "very low creep" is used in the context of the present invention, it can be defined as a material having less than 0.2% creep as determined by ASTM D2990-77—Standard Test Method for Tensile, Compressive and Flexural Creep and Creep Rupture of Plastics. It will be appreciated that SIBS is well known to have poor creep properties, in that SIBS is well known to have creep well above at least 0.5%, and higher as determined by the same ASTM standard.

As stated above, the synthesis of the PSt-g-P(IB-b-St) of the present invention does not require the use of an expensive initiator to initiate, or start, polymerization. Instead, the present invention utilizes a functionalized polystyrene as the initiator for the polymerization of isobutylene. In one or more embodiments of the present invention, the functionalized polystyrene used as the initiator for the polymerization of isobutylene contains —OH, —Cl, or —OMe terminal groups. In one or more embodiments of the present invention, the initiation takes place in the presence of a co-initiator. As defined within the context of the present invention, a co-initiator differs from a typical initiator in that a co-initiator will get eliminated, or washed away, from the final product and will leave behind no residue. The use of a functionalized polystyrene as an initiator and the use of a co-initiator in the synthesis of the present invention is an important feature in producing PSt-g-P(IB-b-St) because it improves the overall processability of the PSt-g-P(IB-b-St) as compared to the processability of SIBS., and at a much lower cost. In at least one embodiment, the polymerization that is initiated is the living cationic polymerization of the isobutylene followed by the living cationic polymerization of styrene.

In one embodiment of the present invention, the following synthesis route is taken to arrive at the novel thermoplastic elastomer, PSt-g-P(IB-b-St), of the present invention. To begin, a polystyrene backbone is provided. Then, the polystyrene backbone is acetylated so as to provide acetyl groups on the polystyrene backbone. Once the acetyl groups are provided on the polystyrene backbone, the acetyl groups are then converted to —C(CH$_3$)$_2$OH groups. Finally, living block polymerization of isobutylene followed by styrene is initiated utilizing a functionalized polystyrene in the presence of a co-initiator to create the novel thermoplastic elastomer PSt-g-P(IB-b-St) of the present invention.

In one embodiment of the present invention, the polystyrene backbone is acetylated by the use of acetyl chloride in the presence of aluminum chloride, and wherein methylene chloride is used as a solvent so as to provide acetyl groups on the polystyrene backbone. In one or more embodiments, the acetyl groups provided on the polystyrene backbone are para-acetyl groups.

In one embodiment of the present invention, the step of converting the acetyl groups first uses methyl magnesium bromide, and then water to convert the acetyl groups to —C(CH$_3$)$_2$OH groups. In another embodiment, the step of converting the acetyl groups first uses methyl magnesium bromide, and then tetrahydrofuran to convert the acetyl groups to —C(CH3)2OH groups.

In one embodiment of the present invention, after the step of converting the acetyl groups to —C(CH$_3$)$_2$OH groups, the —C(CH$_3$)$_2$OH groups are then converted to —C(CH$_3$)$_2$Cl groups using hydrogen chloride to convert the —C(CH$_3$)$_2$OH groups to —C(CH$_3$)$_2$Cl groups. In yet another embodiment of the present invention, after the step of converting the acetyl groups to —C(CH$_3$)$_2$OH groups, the —C(CH$_3$)$_2$OH groups are then converted to —C(CH$_3$)$_2$OMe groups using sodium hydride and methyl iodide to convert the —C(CH$_3$)$_2$OH groups to —C(CH$_3$)$_2$OMe groups.

In one or more embodiments of the present invention, regardless of whether the acetyl groups have been converted to —C(CH$_3$)$_2$OH groups, —C(CH$_3$)$_2$Cl groups, or —C(CH$_3$)$_2$OMe groups, the living block polymerization is initiated using the functionalized polystyrene and is coinitiated using titanium chloride and the polymerization is terminated by methanol so as to precipitate the novel thermoplastic elastomer PSt-g-P(IB-b-St) of the present invention and to decompose the remaining titanium chloride co-initiator.

FIG. 1 shows the structural formula of the novel thermoplastic elastomer PSt-g-P(IB-b-St) of one or more embodiments of the present invention. In one or more embodiments, the molecular weight of the polystyrene backbone of the novel thermoplastic elastomer is from about 5,000 g/mol to about 50,000 g/mol; the molecular weight of the polyisobutylene branches of the novel thermoplastic elastomer are from about 10,000 g/mol to about 60,000 g/mol; and the molecular weight of the polystyrene branches are from about 5,000 g/mol to about 50,000 g/mol. In one embodiment, the molecular weight of the polystyrene backbone of the novel thermoplastic elastomer is about 13,000 g/mol; the molecular weight of the polyisobutylene branches of the novel thermoplastic elastomer are about 30,000 g/mol; and the molecular weight of the polystyrene branches are about 13,000 g/mol.

The molecular weights and their distribution of both the polystyrene and polyisobutylene segments can be precisely controlled by living cationic polymerization. In one or more embodiments of the present invention, it is believed that the superior combination of thermoplastic properties is obtained with a hard (polystyrene)/soft (polyisobutylene) segment ratio of from about 30/70 wt. % to about 40/60 wt. %. For example, with a targeted 30/70 wt. % hard/soft segment ratio, the molecular weight of the polystyrene segment should be between about 13,000 and 14,000 g/mol so as to obtain the maximum Tg (~100° C.) for the hard segment, and the molecular weight of the soft polyisobutylene segments should be about 30,000 g/mol. The morphology with either 30/70 wt. % hard/soft segment, or 40/60 wt. % hard/soft segment is expected to be spherical.

In one or more embodiments of the present invention, the molecular weights of both the polystyrene backbone and the polystyrene branch segments should be the same. The similarity in molecular weights is believed to give the desirable micromorphology of the elastomer of the present invention.

Figure 2:
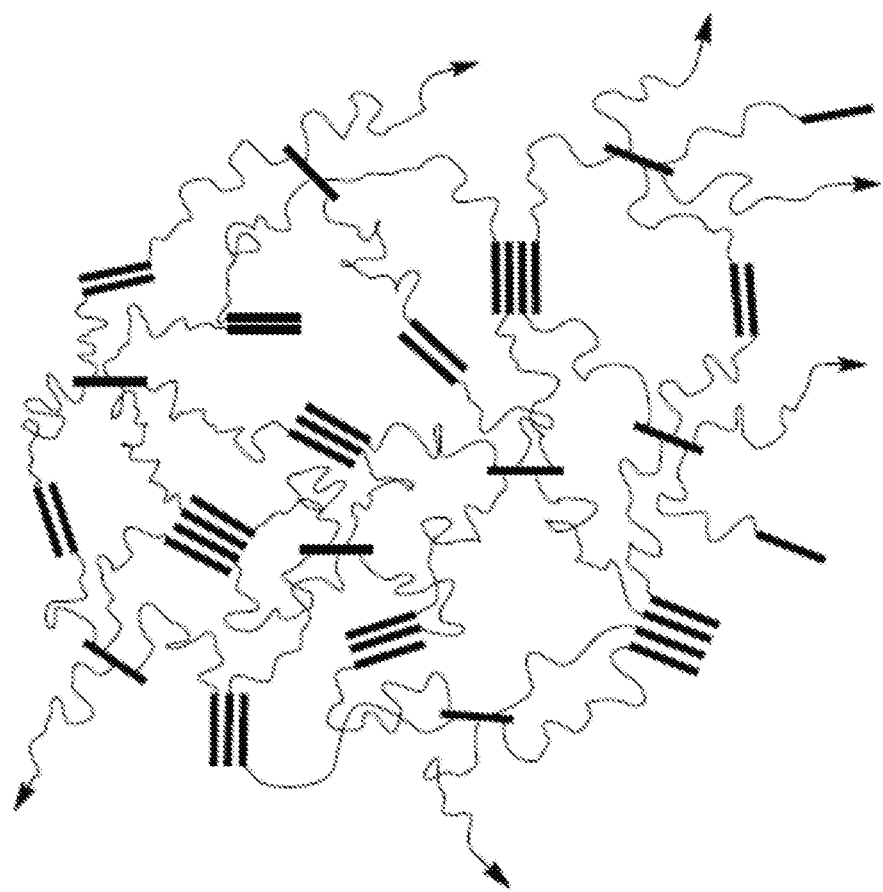
FIG. 2 is a representative microarchitecture of a representative PSt-g-P(IB-b-St)$_5$ polymer network.

FIG. 2 shows the unique microarchitecture of a polymer network of PSt-g-P(IB-b-St) of the present invention. Each PSt-g-P(IB-b-St) of the network contains a rigid glassy segment carrying several rubbery-glassy segments. More particularly, each PSt-g-P(IB-b-St) in the polymer network contains a polystyrene backbone, multiple polystyrene branches, and multiple polyisobutylene branches.

The polyisobutylene branches largely prevent the aggregation of polystyrene backbones so that physical crosslinking will mainly involve unencumbered polystyrene branch segments. The physical crosslinking, or aggregation thereof, of the polystyrene branch segments is believed to take place due to van der Waals forces between the polystyrene branch segments. This microarchitecture, also commonly known as a polymer network, constrains extensibility but leads to multiple entanglements and better stress distribution, which result in superior strength and the virtual absence of creep. Due to branching, the size of the ordered polystyrene domains tend to be small which is believed to lead towards improved stress transfer (strength), higher toughness, higher modulus, and lower viscosity.

Examples

In order to demonstrate practice of the invention, the following examples are offered to more fully illustrate the invention, but are not to be construed as limiting the scope thereof. Further, while some of examples may include conclusions about the way the invention may function, the inventors do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is number average molecular weight, temperature is in degrees Centigrade, and pressure is at or near atmospheric.

The scheme below outlines the synthesis route taken to arrive at PSt-g-P(IB-b-St):

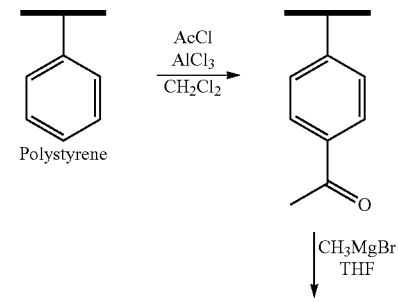

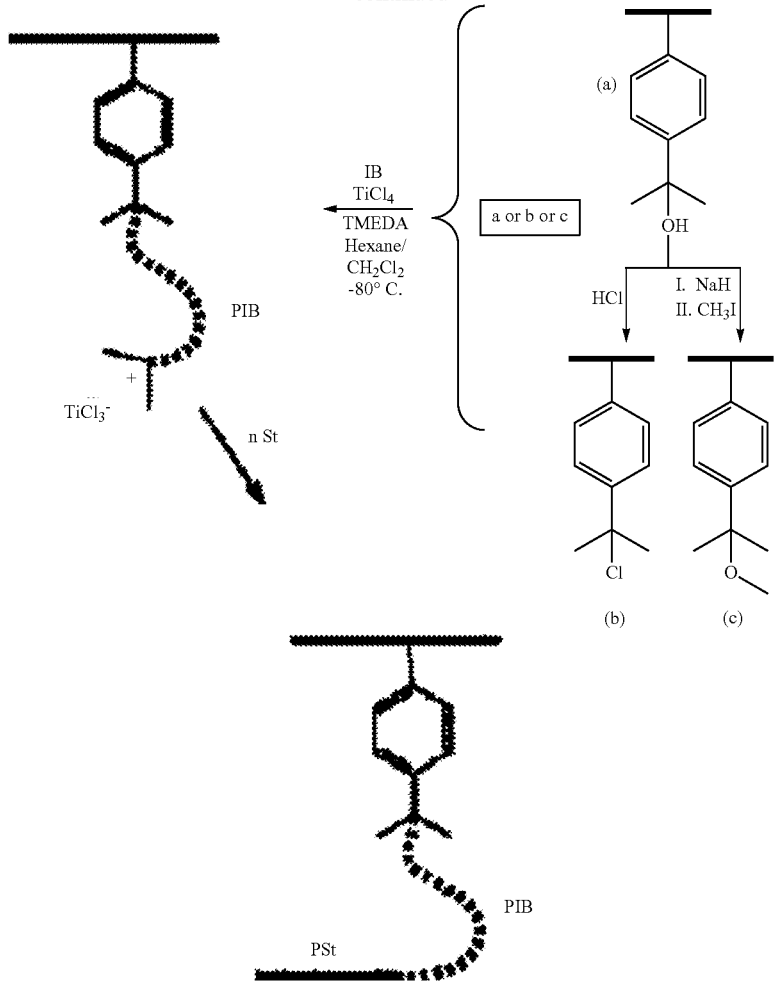

Acetyl-chloride (AcCl), aluminum chloride (AlCl$_3$), magnesium sulfate (MgSO$_4$), titanium chloride (TiCl$_4$), styrene and polystyrene of Mn=35,000 were obtained from Merck. Tetramethylethylene diamine (TMEDA) and methyl magnesium bromide (MeMgBr) solution were obtained from Sigma Aldrich and were used without further purification. Isobutylene (IB) was obtained from Exxon Mobile Co. Methylene chloride (CH$_2$Cl$_2$), tetrahydrofuran (THF) (or alternatively, water) and hexane (from TCI) were all distilled over calcium hydride prior to use.

The acetylated polystyrene (PS) starting material was prepared as follows: A 250 mL flask equipped with a 50 mL addition funnel and a stir bar and containing anhydrous AlCl$_3$ (0.23 g, 1.7 mmol) was evacuated and protected by a blanket of gaseous N$_2$. Then, 20 ml CH$_2$Cl$_2$ was then transferred into the flask via a capillary by nitrogen pressure. The mixture was then cooled to 0° C., and AcCl (0.120 mL, 1.7 mmol) dissolved in 5 mL CH$_2$Cl$_2$ was then added dropwise from the addition funnel into the AlCl$_3$ solution during a 10 minute period. Then, polystyrene (10 g, Mn=35,000 g/mol, 0.20 mmol) dissolved in 100 mL of CH$_2$Cl$_2$ was added, and the reaction was then allowed to proceed for 15 minutes at room temperature. The product obtained is then poured into a beaker containing approximately 10 of ice and 5 mL of concentrated HCl. Then, the inorganic layer formed is separated and washed successively with water and a 5% sodium bicarbonate solution. Once separated and washed, the inorganic layer is dried overnight over anhydrous MgSO$_4$. A rotary evaporator then concentrated the solution and the product formed is precipitated into excess methanol. The yield obtained was 10.07 g, which equates to approximately 99% acetylation.

The acetylated PS was characterized by $^1$H NMR spectroscopy, which showed the expected structure, and GPC, which indicates that the Mn of the product did not change. This process introduces an estimated 6 acetyl groups per PS molecule, i.e., the grafting density is 6.

The acetyl groups (—COCH$_3$) of the acetylated PS were converted to —C(CH$_3$)$_2$OH groups (indicated as intermediate a in Scheme 1) as follows. 10.07 g of the acetylated PS was dissolved in 120 mL of anhydrous THF contained in a 500 mL round bottom flask. 1.2 mL of 3.0 M MeMgBr in diethyl ether is syringed dropwise into the polymer solution under N$_2$ gas. After one hour, the reaction mixture was cooled to 0° C., and then 2 Ml of 3 M HCl was added dropwise. The organic phase was then separated, washed with 20 mL of aqueous NaCl, dried over anhydrous CaCl$_2$, concentrated by a rotary evaporator, and precipitated into excess methanol. The yield obtained was approximately 10.10 g, which equates to approximately 99% completion of reaction.

The —C(CH$_3$)$_2$OH groups are converted into —C(CH$_3$)$_2$Cl groups (indicated as intermediate b in Scheme 1) as follows. Intermediate a (PSt with —C(CH$_3$)$_2$OH groups, 10.10 g, 0.29 mmole) was placed in a Schlenk flask and dissolved in methylene chloride (100 mL) under a blanket of N$_2$ gas. The solution was then transferred by use of a stainless steel capillary into a flame dried 200 mL tubular reactor containing approximately 0.1 g CaCl$_2$. Gaseous HCl (generated by dropwise addition of sulfuric acid onto NaCl) was then bubbled into the solution using a Teflon capillary for six hours at 0° C. under a continuous nitrogen flush. The excess HCl was neutralized by absorbing the gas in aqueous sodium hydroxide. Then, the CaCl$_2$ was filtered off; the solution was concentrated by rotary evaporation; diluted with 100 mL of hexane; and washed with a solution of 5% aqueous sodium bicarbonate and water. The hexane layer was separated and then dried over MgSO$_4$. The drying agent was then filtered off and the solution was concentrated and precipitated in excess cold methanol. The resultant precipitate was separated by filtration, dried under vacuum at room temperature, and stored under nitrogen at −20° C. The yield obtained was approximately 10.12 g, which equates to approximately 99% completion of reaction.

The —C(CH$_3$)$_2$OH groups were converted into —C(CH$_3$)$_2$OMe groups (indicated as intermediate c in Scheme 1) as follows. Intermediate a (PSt with —C(CH$_3$)$_2$OH groups, 10.10 g, 0.29 mmole) was placed in a Schlenk flask and dissolved in THF (100 mL) under a blanket of N$_2$ gas. Then, NaH (0.082 g, 3.4 mmol) dissolved in 20 mL of THF was added dropwise for one hour at 0° C. under a nitrogen atmosphere. Next, CH$_3$I (0.32 mL, 5.1 mmol) dissolved in 10 mL of dried THF was added dropwise at 0° C. The solution was then stirred for 2 hours at 25° C., concentrated by a rotary evaporator, and precipitated into excess methanol. The yield obtained was approximately 10.11 g, which equates to approximately 99% completion of the reaction.

If beginning with intermediate a, (PSt with —C(CH$_3$)$_2$OH groups), the final steps of living block polymerization of isobutylene followed by styrene will be carried out first with the addition of isobutylene in the presence of a co-initiator such as TiCl$_4$. Subsequently, once the polymerization of the isobutylene has been completed, styrene will be added to the active polymer solution. Once the polymerization of the styrene has been completed, the polymerization will be terminated, the polymer will be washed and then dried; all solvents will then be removed and the final product, PSt-g-P(IB-b-St), will be collected.

When beginning with intermediate b, (PSt with —C(CH$_3$)$_2$Cl groups), the final steps of living block polymerization of isobutylene followed by styrene is carried out as follows. 1.5 g (0.043 mmol) of intermediate b was placed into a 500 mL round bottom flask equipped with a magnetic stir bar, the flask was evacuated and blanketed with N$_2$ gas. Next, 120 mL hexane and 80 mL of dichloromethane was added by a stainless steel capillary, and then TMEDA (0.078 mL, 0.52 mmol) was added by syringe under an N$_2$ atmosphere. The system was then cooled to −80° C. Then, IB (10.3 mL, 0.14 mol) was added, followed by the addition of TiCl$_4$ (0.29 mL, 2.61 mmol). The polymerization was allowed to proceed for one hour. Subsequently, styrene (4.31 mL, 37.6 mmol) was transferred into the active polymer solution. The polymerization of the added styrene was allowed to proceed for one hour and was terminated with the addition of 10 ml of methanol. The system was then warmed to room temperature, the solution was decanted, the polymer was dissolved in hexane, and then washed with 5% aqueous sodium bicarbonate and water. The organic phase was then dried overnight over magnesium sulfate, the solids were then removed by filtering through fine sintered glass. The solvent was removed by evaporation by use of a rotary evaporator. The product, PSt-g-P(IB-b-St), was then dried in a vacuum oven at 50° C. for 2 days. The yield obtained was approximately 13.11 g, which equates to approximately 99% completion of reaction.

When beginning with intermediate c, (PSt with —C(CH$_3$)$_2$OMe groups), the final steps of living block polymerization of isobutylene followed by styrene is carried out first with the addition of isobutylene in the presence of a co-initiator such as TiCl$_4$. Subsequently, once the polymerization of the isobutylene has been completed, styrene will be added to the active polymer solution. Once the polymerization of the styrene has been completed, the polymerization will be terminated, the polymer will be washed and then dried; all solvents will then be removed and the final product, PSt-g-P(IB-b-St), will be collected.

Regardless of what intermediate is used, the final product of PSt-g-P(IB-b-St) can then be characterized by NMR spectroscopy, which will show the presence of both the PIB and PSt. The PSt-g-P(IB-b-St) created using intermediate b, as discussed above, showed high tensile strength elongation, toughness, and a low creep and the Inventors believe that PSt-g-P(IB-b-St) created using intermediate a or c will also show high tensile strength elongation, toughness, and a very low creep.

The same procedure as described above was repeated, except that the amount of styrene used during the final step of living block polymerization was increased. In this second example, the amount of styrene used was 5.7 mL (50.12 mmol) as compared to the 4.31 mL (37.6 mmol) used in the example above creating PSt-g-P(IB-b-St) using intermediate b. The composition and molecular architecture, respectively, of the two PSt-g-P(IB-b-St) formed are shown in Table 1 below.

TABLE 1

| | Mn (g/mol) × 10$^{-3}$ | | | | Composition (wt %) | | |
|---|---|---|---|---|---|---|---|
| Example | PSt$_{bb}$ | PIB$_{br}$ | PSt$_{br}$ | PSt-g-P(IB-b-St)$_6$ ** | PSt$_{bb}$ | PIB$_{br}$ | PSt$_{br}$ |
| 1 | 35 | 30 | 15 | 305 | 11.5 | 59.0 | 29.5 |
| 2 | 35 | 30 | 20 | 335 | 11.5 | 53.7 | 35.8 | bb in the subscript is backbone and br in the subscript is branch
** indicated the number of arms per PSt backbone The PSt-g-P(IB-b-St) formed from Example 2 was characterized by NMR spectroscopy, which showed the presence of both the PIB and PSt. The PSt-g-P(IB-b-St) showed high tensile strength elongation, toughness, and a very low creep.

In light of the foregoing, it should be appreciated that the present invention significantly advances the art by providing a novel structure and synthesis of a polystyrene-g-(polyisobutylene-b-polystyrene) PSt-g-P(IB-b-St) that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A polystyrene-g-(polyisobutylene-b-polystyrene).
2. The polystyrene-g-(polyisobutylene-b-polystyrene) of claim 1 having a tensile strength of greater than 20 MPa.
3. The polystyrene-g-(polyisobutylene-b-polystyrene) of claim 1 having an elongation of greater than 400%.

4. A method of synthesizing a polystyrene-g-(polyisobutylene-b-polystyrene) comprising the steps of:
provide a polystyrene backbone;
acetylating the polystyrene backbone to provide between about 2 and about 20 acetyl groups on the polystyrene backbone;
converting the acetyl groups to —C(CH3)2OH groups; and
initiating in the presence of a co-initiator the living block polymerizations of isobutylene followed by styrene.

5. The method of claim 4, wherein the step of acetylating provides between 4 and 7 acetyl groups on the polystyrene backbone.

6. The method of claim 4, wherein the step of acetylating provides 5 or 6 acetyl groups on the polystyrene backbone.

7. The method of claim 4, wherein prior to the step of initiating, the —C(CH3)2OH groups are converted to —C(CH3)2Cl groups.

8. The method of claim 7, wherein the step of converting the —C(CH3)2OH groups to —C(CH3)2Cl groups uses hydrogen chloride to convert the —C(CH3)2OH groups to —C(CH3)2Cl groups.

9. The method of claim 4, wherein prior to the step of initiating, the —C(CH3)2OH groups are converted to —C(CH3)2OMe groups.

10. The method of claim 9, wherein the step of converting the —C(CH3)2OH groups to —C(CH3)2OMe groups uses sodium hydride and methyl iodide to convert the —C(CH3)2OH groups to —C(CH3)2OMe groups.

11. The method of claim 4, wherein the co-initiator is TiCl4.

12. The method of claim 11, wherein the polymerization is terminated by methanol so as to precipitate the polystyrene-g-(polyisobutylene-b-polystyrene) and to decompose the TiCl4.

13. The method of claim 4, wherein the molecular weight of the polystyrene backbone is from about 5,000 g/mol to about 50,000 g/mol.

14. The method of claim 4, wherein the method produces a polystyrene-g-(polyisobutylene-b-polystyrene) having multiple polyisobutylene branch segments, and wherein the molecular weight of each of the multiple polyisobutylene branch segments is from about 10,000 g/mol to about 60,000 g/mol.

15. The method of claim 4, wherein the method produces a polystyrene-g-(polyisobutylene-b-polystyrene) having multiple polystyrene branch segments, and wherein the molecular weight of each of the multiple polystyrene branch segments is from about 5,000 g/mol to about 50,000 g/mol.

16. The method of claim 4, wherein the step of acetylating uses acetyl chloride in the presence of aluminum chloride, and wherein methylene chloride is a solvent to provide para-acetyl groups on the polystyrene backbone.

17. The method of claim 16, wherein the step of converting the acetylated groups first uses methyl magnesium bromide, and then water or tetrahydrofuran to convert the acetylated groups to —C(CH3)2OH groups.

18. The method of claim 4 wherein the polystyrene-g-(polyisobutylene-b-polystyrene) synthesized has a tensile strength of greater than 20 MPa.

19. The method of claim 4 wherein the polystyrene-g-(polyisobutylene-b-polystyrene) synthesized has an elongation of greater than 400%.

20. A polymer network of polystyrene-g-(polyisobutylene-b-polystyrene).

21. The polymer network of claim 20 wherein each polystyrene-g-(polyisobutylene-b-polystyrene) in the network contains a polystyrene backbone, multiple polystyrene branch segments, and multiple polyisobutylene branch segments.

22. The polymer network of claim 21 wherein each polystyrene branch segment of polystyrene-g-(polyisobutylene-b-polystyrene) in the network aggregate towards other polystyrene branch segments of other polystyrene-g-(polyisobutylene-b-polystyrene)s.

23. The network of claim 22 wherein the polyisobutylene branch segments of each polystyrene-g-(polyisobutylene-b-polystyrene) in the network prevent aggregation of the polystyrene backbones of each polystyrene-g-(polyisobutylene-b-polystyrene).

* * * * *